Oct. 23, 1945.　　　　E. M. SCHENK　　　　2,387,532
MACHINE CONTROL
Filed March 13, 1942　　　　2 Sheets-Sheet 1
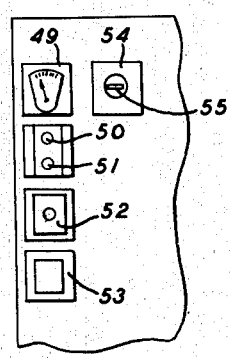
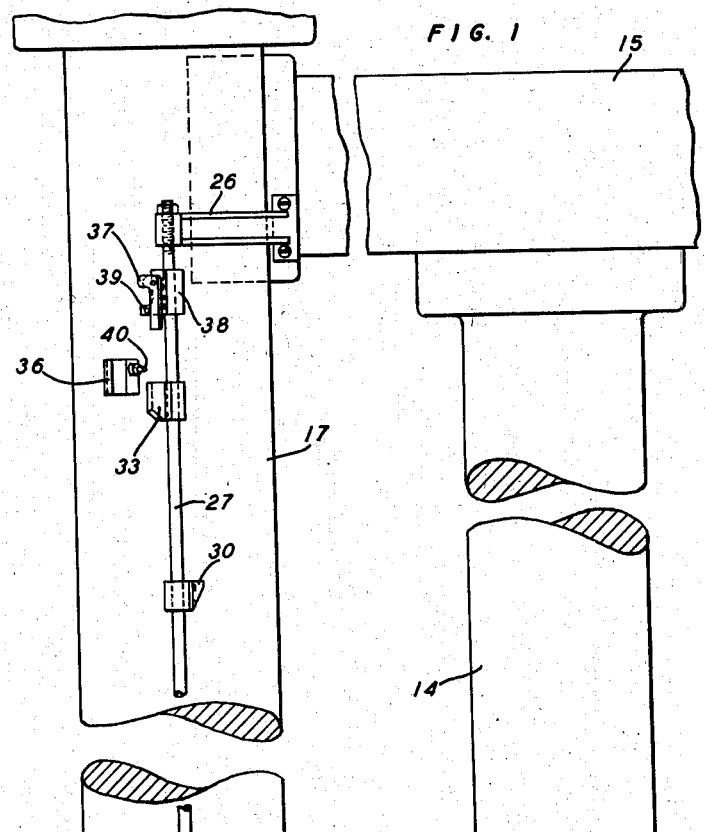
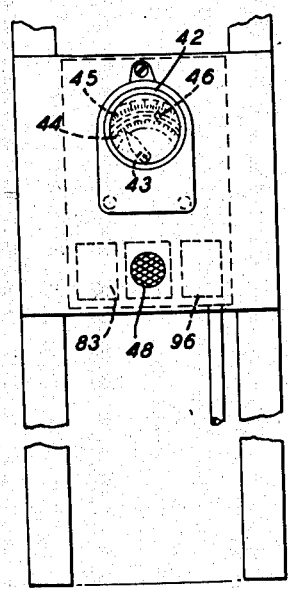
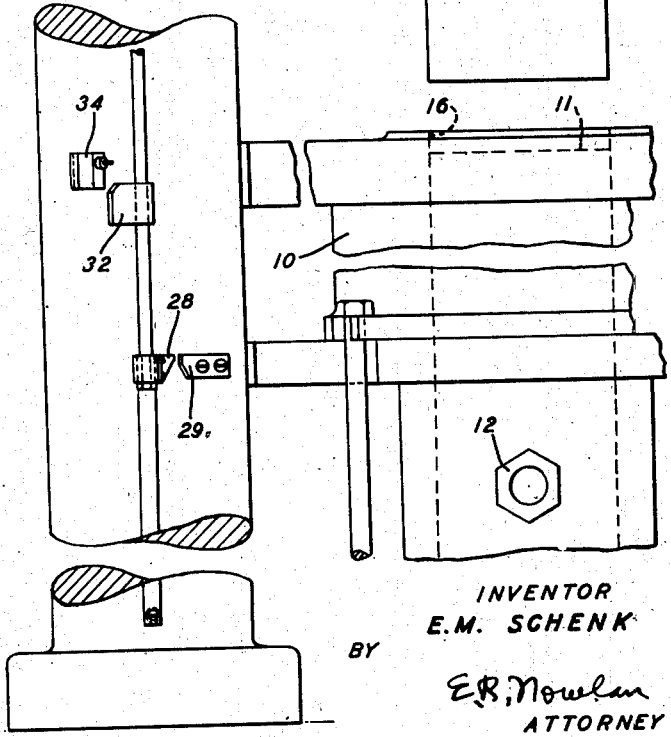
INVENTOR
E.M. SCHENK
BY
E.R. Nowlan
ATTORNEY

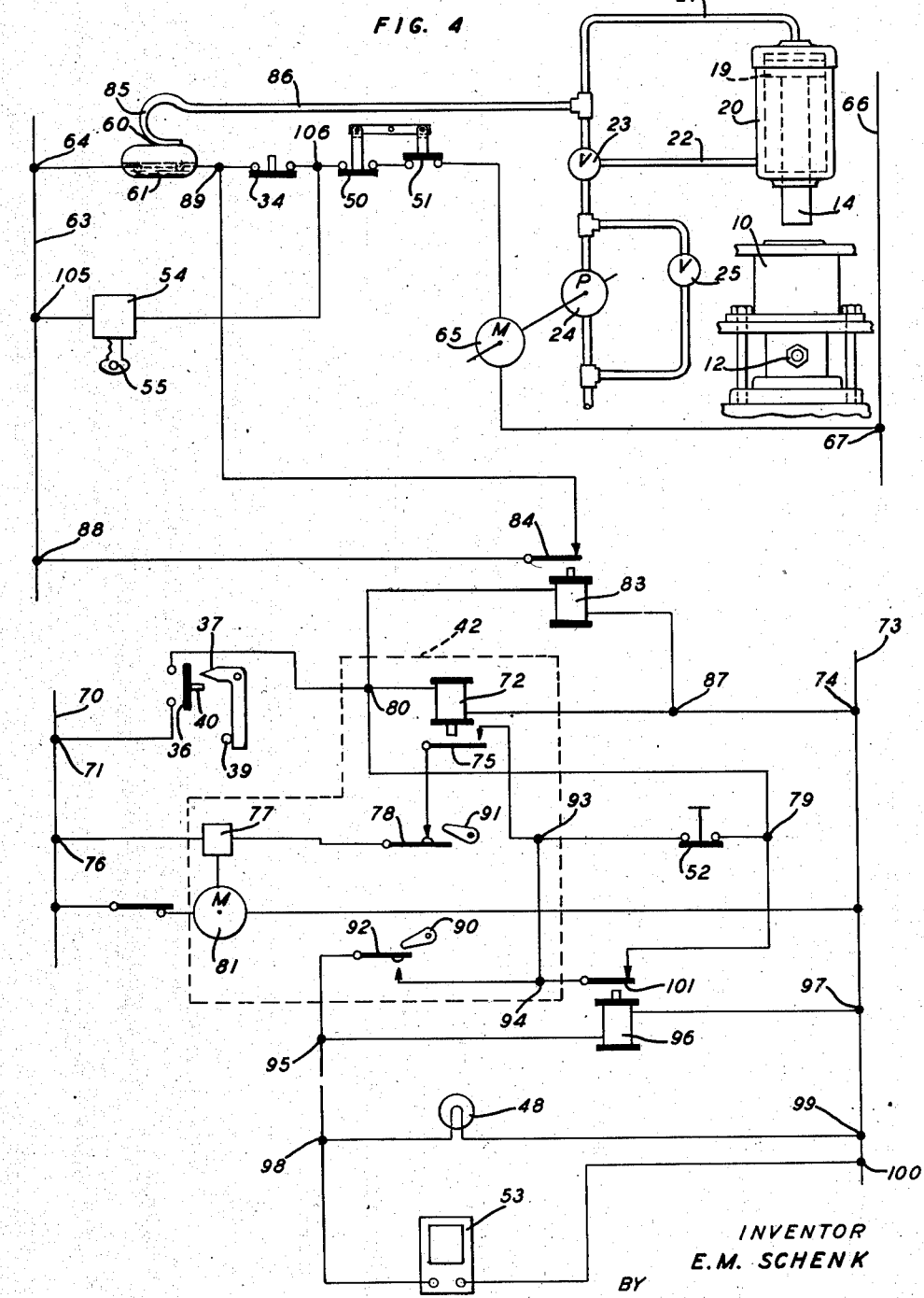

Patented Oct. 23, 1945

2,387,532

UNITED STATES PATENT OFFICE 2,387,532

MACHINE CONTROL

Everett M. Schenk, New Providence, N. J., assignor to Western Electric Company, Incorporated, New York, N. Y., a corporation of New York Application March 13, 1942, Serial No. 434,559

3 Claims. (Cl. 207—2)

This invention relates to machine controls, and more particularly to controls for extrusion presses.

Extrusion presses, particularly those for extruding lead antimony sheaths on cores, such as electrical conducting cables, require attention in the control of the ram, particularly the limits of movement thereof and the timing of the solidification period of a new charge disposed in the cylinder.

An object of the invention is to provide a machine control particularly adaptable to extrusion presses, to accurately control the limits of relatively movable members and to efficiently indicate the time interval the members remain at rest at a given position.

With this and other objects in view, the invention comprises a control for a machine having a material supporting member and a material engaging member mounted for relative movement to apply a given pressure on the material, the control including units to limit the relative movement of the members to maintain the pressure, and electrical means under the control of a time registering element to maintain the pressure for a predetermined length of time.

Other objects and advantages will be apparent from the following detailed description when considered in conjunction with the accompanying drawings, wherein Fig. 1 is a fragmentary front elevational view of a machine illustrating mechanical portions of the control;

Fig. 2 is a front elevational view of certain units of the control;

Fig. 3 is a fragmentary front elevational view of a control panel with other units of the control, and Fig. 4 is a wiring diagram illustrating the electrical circuits of the control.

Referring now to the drawings, attention is first directed to Fig. 1, which illustrates a portion of an extrusion press, the type of machine selected to illustrate the invention. Although only a portion of the press is illustrated, the important features are shown and other features may be apparent. The press includes a cylinder 10 for receiving a charge of material 11, such as molten lead, the cylinder being mounted upon a suitable support (not shown) and including an outlet or extrusion nozzle 12 through which a core may be passed to receive a sheath of the material from the cylinder. A ram 14, supported by a head 15 in alignment with an opening 16 of the cylinder, is supported for vertical movement on a plurality of columns 17, only one of which is shown. Suitable means may be provided to cause movement of the ram 14 through movement of its head 15. In Fig. 4 a diagrammatic illustration of one means is shown. In this illustration a piston 19 is operatively connected to the ram 14 and is disposed in a cylinder 20, the latter being connected selectively to fluid lines 21 and 22 through a valve 23 to receive a fluid under pressure from a pump 24 to cause movement of the piston 19 downwardly or upwardly depending upon the position of the valve. The fluid pressure present in the fluid lines 21 and 22 may be varied by a valve 25 in a by-pass about the pump as shown.

Attention is again directed to Fig. 1, which illustrates a bracket 26 rigidly mounted on the head 15 and curved to extend a desired distance about the column 17. A vertical rod 27 is supported by the outer end of the bracket 26, the rod extending downwardly from the bracket and parallel with the column to a point where it supports an indicating pointer 28. In the present illustration the pointer 28 is located in registration with a stationary indicator 29 mounted upon the column 17, thus indicating the starting position of the ram 14. Another indicating pointer 30, similar to the pointer 28, is mounted upon the rod 27 at a position above the pointer 28, to indicate the finishing position for the ram when located in registration with the stationary indicator 29. Switch actuating cams 32 and 33 are mounted upon the rod 27 at the positions shown, and although each cam is adapted to actuate a switch 34 mounted on the column 17, these cams function, not during the normal operation of the press, but as protective means adapted to stop the ram at its upper and lower limits respectively, should the operator's attention not be directed to the press during these intervals of time in which the press is operated. Another switch 36 is mounted upon the column 17 and is adapted to be operated by a cam 37, the latter being of the lever type pivotally supported by an apertured block 38 mounted on the rod 27 and held at a selected position thereon by any suitable means, such as a set screw. A stop 39, carried by the block 38, is positioned to limit rotation of the cam 37 clockwise, so as to assure actuation of the switch 36 during downward movement of the rod 27 and the ram 14, but to allow actuation of the cam during upward movement of these parts, the cam in this instance being rotated as it strikes the plunger 40 of the switch.

The portion of the control illustrated in Fig. 2 includes a plurality of electrical units of the control circuit together with a time clock 42 of a conventional type, including a motor driven mechanism for moving a hand 43 relative to time indicating dials 44 and 45 and a variable limit or stop 46. In this structure a visual signal, such as an indicating light 48, is also disposed.

Other units are illustrated in Fig. 3 which may function in the control of the press. The functions of these units will be described more in detail hereinafter, but in referring to them generally reference numeral 49 indicates a pressure gage registering the pressure of the ram 14. Units 50 and 51 are electrical switches respectively opening and closing an electrical circuit to effect stopping and starting the pump motor 65. A unit 52 is an electrical switch to effect stopping the time clock 42 and an electrical unit 53 is a buzzer or other suitable audible unit energized through the control of the clock 42 for a purpose hereinafter described. A unit 54 is a lock switch actuable by a key 55 to recondition the press for operation after it has passed beyond limits controlled by the cams 32 and 33 and the switch 34.

Attention is now directed to the wiring diagram in Fig. 4 through the aid of which the functions of the parts and units previously described may be clearly understood. The various electrical units and switches illustrated in the wiring diagram and the other cooperating parts of the control illustrated in the drawings are in the positions which they assume when the press is in its starting position. By the term "starting" position it is not meant that the press is ready to start extruding the material but that the press is open to receive a new charge of the material 11. When in this position there is no fluid pressure in the fluid line 21 and a pressure control switch 60, which functions with the pressure gage 49 and includes a mercury switch 61 is in a position where the contacts of the switch 61 are closed. When in this position a circuit is completed, through the closing of the switch 50 and its associated switch 51, from a supply line 63 at connection 64 through the switch 61, the normally closed switch 34, switches 50 and 51, a motor 65 for driving the pump 24, to another supply line 66 of the main supply circuit at connection 67. The ram 14 may be moved downwardly, by the force of the fluid under the control of the valve 23, into the cylinder opening 16, where it meets the material 11, until there is a pressure of five hundred pounds per square inch on the material, this pressure being registered on the pressure gage 49. During the downward movement of the ram the cam 37 (Figs. 1 and 4) is moved downwardly with the rod 27 and the moment the ram engages the material in the cylinder, the cam causes actuation of the switch 36 to complete a circuit from a supply line 70 at connection 71, through switch 36, a relay 72, to a supply line 73 at connection 74. The reason for the two sets of supply lines is that the motor 65 for driving the pump, in the present embodiment, requires electrical connection with a 440-volt alternating current supply, whereas the electrical units in the lower portion of the diagram require a 110-volt alternating current supply.

Returning now to the relay 72, which is a part of the mechanism of the time clock 42 represented in Fig. 4 by the dotted lines bearing the same reference numeral, the relay, when energized, closes a contact 75 to complete a circuit from line 70, at 76, through a motor clutch coil unit 77, a normally closed contact 78, contact 75, switch 52, connections 79 and 80, relay 72, to line 73 at connection 74. This completes a locking circuit for the relay 72. The moment the relay 72 is energized the time clock mechanism is started, through the operation of the clutch unit 77, to render a motor 81 effective to actuate the time clock mechanism (not shown) to move the hand 43 (Fig. 2) relative to the dials 44 and 45 and the set stop 46. The motor 81 is normally energized during the operation of the press, it being electrically connected to the supply lines 70 and 73 as shown in Fig. 4. The moment the switch 36 is closed to cause energization of the relay 72, a relay 83 is energized to open a normally closed contact 84, to place the circuit including the motor 65 under the control of the mercury switch 61. This is a safety function against the application of a greater pressure to the material 11 through the ram 14. The mercury switch 61, which is a part of the pressure gage 49, is moved with the indicating pointer thereof through variations in a tube 85 connected to the supply line 21 through a line 86. The circuit through the relay 83 may be traced from line 70 at connection 71 through switch 36, connection 80, relay 83, connection 87, to line 73 at 74. The relay 83 is also included in the aforementioned locking circuit at the connections 80 and 87. The circuit including the contact 84 may be traced from line 63 at connection 88, through contact 84, connection 89, switches 34, 50 and 51, motor 65, to line 66 at connection 67.

The time required for the proper solidification of the material, that is the cooling of the material to a plastic state where it may be ready for extrusion, depends upon the type of material employed. In the present instance the material is a lead antimony used for the extrusion of metallic sheaths on electrical cables and the time required for the solidification of this type of material is six and one-half minutes. The stop 46 of the time clock 42 is, therefore, located with respect to the dials 44 and 45 to register six and one-half minutes. The movement of the stop 46 relative to the pointer or hand 43 creates an adjustment of switch controlling elements, such as cams 90 and 91, relative to their contacts 92 and 78 respectively. The cam 90 is adapted to close its contact 92 at the end of the six and one-half minute period. At this time a circuit is completed from line 70 at connection 76 through clutch coil unit 77, contacts 78 and 75, connections 93, 94 and 95, through a relay 96 to line 73 at connection 97. Additional circuits are completed at the same time through the light 48 and the buzzer 53, the first being continued from connection 95 through connection 98, light 48 to line 73 at connection 99, the other being continued from connection 98 through the buzzer 53, to line 73 at connection 100. Therefore, at the end of the solidification period, the visual signal 48 will be illuminated and the audible signal 53 will be energized, notifying the operator that the press is ready for the beginning of the extrusion operation. The relay 96 and its contact 101 function in connection with a shunted portion of the circuits previously described, including that portion between the connections 93 and 94, around the switch 52, to render the latter ineffective to stop the clock mechanism during the selected time interval for the cooling of the material. However, upon energization of the relay 96 at the end of this time interval, the switch 52 is rendered effective to deenergize the clutch unit 77 by opening the circuit thereto. The actuation of the switch 52 will also open the locking circuit through the relays 72 and 83, simultaneously causing deenergization thereof to discontinue the controlling effect of the timing circuits and mechanism, allowing the contact 84 to close, completing the circuit around the mercury switch 61 to the motor 65 so that additional pressure may be applied to the material 11 for the extrusion thereof. The actuation of the switch 52 also opens the circuit to the visual and audible signals 48 and 53 respectively. If by any chance the operator should not observe the signals and allow the control mechanism to continue, the visual and audible signals will remain functioning for a given length of time controlled by the cam 91, which may be set to open the contact 78 to effectively accomplish the same result which is accomplished by the manual actuation of the switch 52.

In reviewing the operation of the apparatus, beginning with the time the cylinder 10 is provided with the charge of material 11, the ram 14 is in the position shown in Fig. 1 and the indicating pointer 28 in registration with the indicator 29. The material disposed in the cylinder is in a fluid state, and after the material has been skimmed of undesired substances the ram 14 may be lowered, through the closing of the switches 50 and 51, to start the pump motor 65 and the actuation of the valve 23, to apply the desired pressure to the material to prevent the forming of shrinkage cavities therein during the six and one-half minute solidification period. The moment the ram reaches the material and applies the desired pressure, the switch 36 is closed through the actuation of the cam 37, energizing the relays 72 and 83 simultaneously, the latter causing the placing of the circuit through the motor 65 under the direct control of the mercury switch 61, which functions to allow only the given pressure to be applied to the material, any greater pressure causing actuation of the mercury switch to open the circuit to the pump motor. The moment the switch 36 is closed, the relay 72 is energized, this relay being immediately locked in through a circuit including the clutch coil unit 77 which is adapted to connect the time clock motor 81 with other operable mechanism of the clock including the hand 43 and the cams 90 and 91. Thus, continued movement of the cam 37 to effect opening of the switch 36, will not interrupt continued functioning of the time clock mechanism. This mechanism remains effective against stopping through accidental operation of the switch 52, due to the shunted circuit, through the normally closed contact 101 for the duration of the solidification period. At the end of this period, the cam 90 having opened the contact 101, has rendered the switch 52 effective, upon manual actuation, to stop the time clock mechanism and to open circuits through the visual and audible signals 48 and 53. The opening of the switch 52 also causes deenergization of the relays 72 and 83, rendering the pump motor circuit effective for the continued or increased pressure to the material through the ram to begin the extrusion operation. This operation may continue automatically, to apply a constant extrusion pressure, it being the operator's duty, however, to stop the extrusion pressure at the time the indicating pointer 30 reaches the indicator 29. If, however, the operator fails to carry out this function, the cam 33, in its downward movement with the rod 27, will cause actuation of the switch 34 to open the circuit to the motor 65 to stop the pump and thus stop the fluid pressure to move the ram. It is, therefore, necessary, in order to continue operation of the press, for the operator to actuate the switch 54. This switch must be actuated by the aid of the key 55. The key may be carried by the operator's supervisor, whose attention must then be called to the fact that the press was not stopped at the proper point. This is a safety factor to eliminate damage to the press should the ram not be stopped at the given point. A similar operation takes place when the ram is moved upwardly, should the ram not be stopped at the starting point with the pointer 28 registering with the indicator 29. Movement of the ram beyond this position causes actuation of the switch 34, through the cam 32, to open the circuit to the pump motor 65, requiring actuation of the switch 54 to bring about further operation of the press. The circuit for the switch 54 may be traced from line 63 at connection 105, through the switch 54 when closed by the key 55, through connection 106, switch 51, motor 65, to line 66 at connection 67.

With this control, the operation of the machine, which in this instance is an extrusion press, does not require the constant attention of the operator. The accuracy in the time interval for the cooling or solidification period of the material is of great importance in that the application of an extrusion pressure on the material prior to the termination of the solidification period, would result in hazardous blowouts of the material at the extrusion nozzle. Thus the control provides automatic accurate timing of the cooling period, eliminates short and faulty timing, thereby eliminating hazardous blowouts, gives positive notification of the end of the cooling period, and minimizes over-travel of the ram in either direction.

In the present embodiment the machine selected to illustrate the invention is an extrusion press, one wherein the ram is moved downwardly into the cylinder. It should be understood that the control would operate efficiently on presses wherein the cylinder was moved relative to the ram or both the ram and the cylinder were moved relative to each other. Furthermore, the control would operate efficiently on other types of machines, for example, on punch or forming presses wherein members are moved relative to each other to apply variable pressures on material for variable lengths of time.

Although specific improvements of the invention have been shown and described it will be understood that they are but illustrative and that various modifications may be made therein without departing from the scope and spirit of this invention as defined by the appended claims.

What is claimed is:

1. An extrusion press including a cylinder to receive material to be extruded, which material has been heated to a molten state, an extrusion nozzle for the cylinder and through which the material may be extruded, a ram receivable in the cylinder, a fluid pump, a fluid connection between said pump and cylinder for creating relative movement between said ram and said cylinder, a motor for operating said pump, and a control for said motor comprising, a first means receiving fluid from said pump and actuable under a predetermined pressure thereof for stopping said motor and therefore said pump and ram after a predetermined movement of said ram has created a predetermined pressue on said molten material, a timing mechanism, a second means constructed to be automatically actuated prior to the stopping of said motor for starting the timing mechanism, and means actuated by said timing mechanism after a predetermined time lapse sufficient for said material to attain an extrusion state, for starting said motor for operating the pump to again cause relative movement of the ram and cylinder under such pressure as to extrude the material through the nozzle.

2. An extrusion press including a cylinder to receive material to be extruded, which material has been heated to a molten state, an extrusion nozzle for the cylinder and through which the material may be extruded, a ram receivable in the cylinder, a fluid pump, a fluid connection between said pump and said cylinder for creating relative movement between said ram and said cylinder, a motor for operating said pump, and a control for said motor comprising, a switch in a circuit including said motor, a first means receiving fluid from said pump and actuable under a predetermined pressure thereof for moving the switch into open position to stop said motor and therefore said pump and ram after a predetermined movement of said ram has created a predetermined pressure on the molten material, a timing mechanism, a second means constructed to be automatically actuated prior to the stopping of said motor for starting the timing mechanism, and means actuated by said timing mechanism after a predetermined time lapse sufficient for said material to attain an extrusion state, for starting said motor for operating the pump to again cause relative movement of the ram and cylinder under such pressure as to extrude the material through the nozzle.

3. An extrusion press including a cylinder to receive material to be extruded, which material has been heated to a molten state, an extrusion nozzle for the cylinder and through which the material may be extruded, a ram receivable in the cylinder, a fluid pump, a fluid connection between said pump and said cylinder for creating relative movement between said ram and said cylinder, a motor for operating said pump, and a control for said motor comprising, a switch in a circuit including said motor, a first means receiving fluid from said pump and actuable under a predetermined pressure thereof for moving the switch into open position to stop said motor and therefore said pump and ram after a predetermined movement of said ram has created a predetermined pressure on the molten material, a timing mechanism, a second means constructed to be automatically actuated prior to the stopping of said motor for starting the timing mechanism, and a shunt circuit for the motor about the switch, held open by said timing mechanism, to render the switch ineffective to stop the motor after a predetermined time lapse sufficient for said material to attain an extrusion state, to start said motor for operating the pump to again cause relative movement of the ram and cylinder under such pressure as to extrude the material through the nozzle.

EVERETT M. SCHENK.